US012504276B2

(12) United States Patent
Watanabe et al.

(10) Patent No.: US 12,504,276 B2
(45) Date of Patent: Dec. 23, 2025

(54) SHAPE MEASURING AND VIBRATION DETECTION

(71) Applicant: HITACHI, LTD., Tokyo (JP)

(72) Inventors: Masahiro Watanabe, Tokyo (JP); Tatsuo Hariyama, Tokyo (JP); Kenji Maruno, Tokyo (JP); Shinya Hamagishi, Tokyo (JP); Motoki Harayama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 663 days.

(21) Appl. No.: 17/921,402

(22) PCT Filed: May 10, 2021

(86) PCT No.: PCT/JP2021/017730
§ 371 (c)(1),
(2) Date: Oct. 26, 2022

(87) PCT Pub. No.: WO2021/241187
PCT Pub. Date: Dec. 2, 2021

(65) Prior Publication Data
US 2023/0194247 A1 Jun. 22, 2023

(30) Foreign Application Priority Data
May 28, 2020 (JP) ................................. 2020-093416

(51) Int. Cl.
G01B 11/25 (2006.01)
G01B 11/00 (2006.01)
(Continued)

(52) U.S. Cl.
CPC ........ *G01B 11/2504* (2013.01); *G01B 11/007* (2013.01); *G01B 11/026* (2013.01); *G01B 11/24* (2013.01); *G06T 7/50* (2017.01)

(58) Field of Classification Search
CPC . G01B 11/2504; G01B 11/007; G01B 11/026; G01B 11/12; G01B 11/24; G06T 7/50
See application file for complete search history.

(56) References Cited

U.S. PATENT DOCUMENTS

| 10,900,773 B2 | 1/2021 | Watanabe et al. |
| 2013/0197844 A1* | 8/2013 | Oota ............... G06F 17/10 702/94 |

(Continued)

FOREIGN PATENT DOCUMENTS

| JP | H0681520 B2 * | 10/1994 | ............... G01J 9/00 |
| JP | 08-82753 A | 3/1996 | |

(Continued)

OTHER PUBLICATIONS

International Search Report of PCT/JP2021/017730 dated Jul. 27, 2021.

*Primary Examiner* — Michael P LaPage
(74) *Attorney, Agent, or Firm* — MATTINGLY & MALUR, PC

(57) ABSTRACT

An object is to provide a technique capable of measuring a shape of an object while maintaining accuracy even when positional accuracy of a mechanism configured to move a probe is insufficient. A measurement control device 210 controls a movement mechanism 500 to move a measurement probe 160 to a target position of a target to be measured, calculates an error between an actual position of the measurement probe 160 detected by the measurement probe 160 and the target position, corrects the error by moving the measurement probe 160 by the movement mechanism 500 based on the calculated error, and then causes the measurement probe 160 to perform a distance measurement.

12 Claims, 8 Drawing Sheets

(51) Int. Cl.
  *G01B 11/02* (2006.01)
  *G01B 11/24* (2006.01)
  *G06T 7/50* (2017.01)

(56) References Cited

U.S. PATENT DOCUMENTS

| | | | | |
|---|---|---|---|---|
| 2016/0258738 | A1* | 9/2016 | Shimaoka | ............ G01B 11/007 |
| 2017/0248399 | A1* | 8/2017 | Takahama | ................ G01B 5/12 |
| 2017/0248411 | A1* | 8/2017 | Yamazaki | ............... G01B 11/30 |
| 2020/0041259 | A1* | 2/2020 | Watanabe | ............ G01S 7/4818 |
| 2021/0333093 | A1* | 10/2021 | Tobiason | ............. G01B 11/007 |

FOREIGN PATENT DOCUMENTS

| | | | | | |
|---|---|---|---|---|---|
| JP | 2005211993 | A | * | 8/2005 | ............. B25J 13/00 |
| JP | 2007-125633 | A | | 5/2007 | |
| JP | 4443497 | B2 | * | 3/2010 | ................ B25J 9/10 |
| JP | 4667400 | B2 | | 4/2011 | |
| JP | 2018-205301 | A | | 12/2018 | |
| JP | 6513846 | B2 | | 5/2019 | |
| KR | 20160097401 | A | * | 8/2016 | ............. B25J 9/163 |

* cited by examiner

[FIG 1]
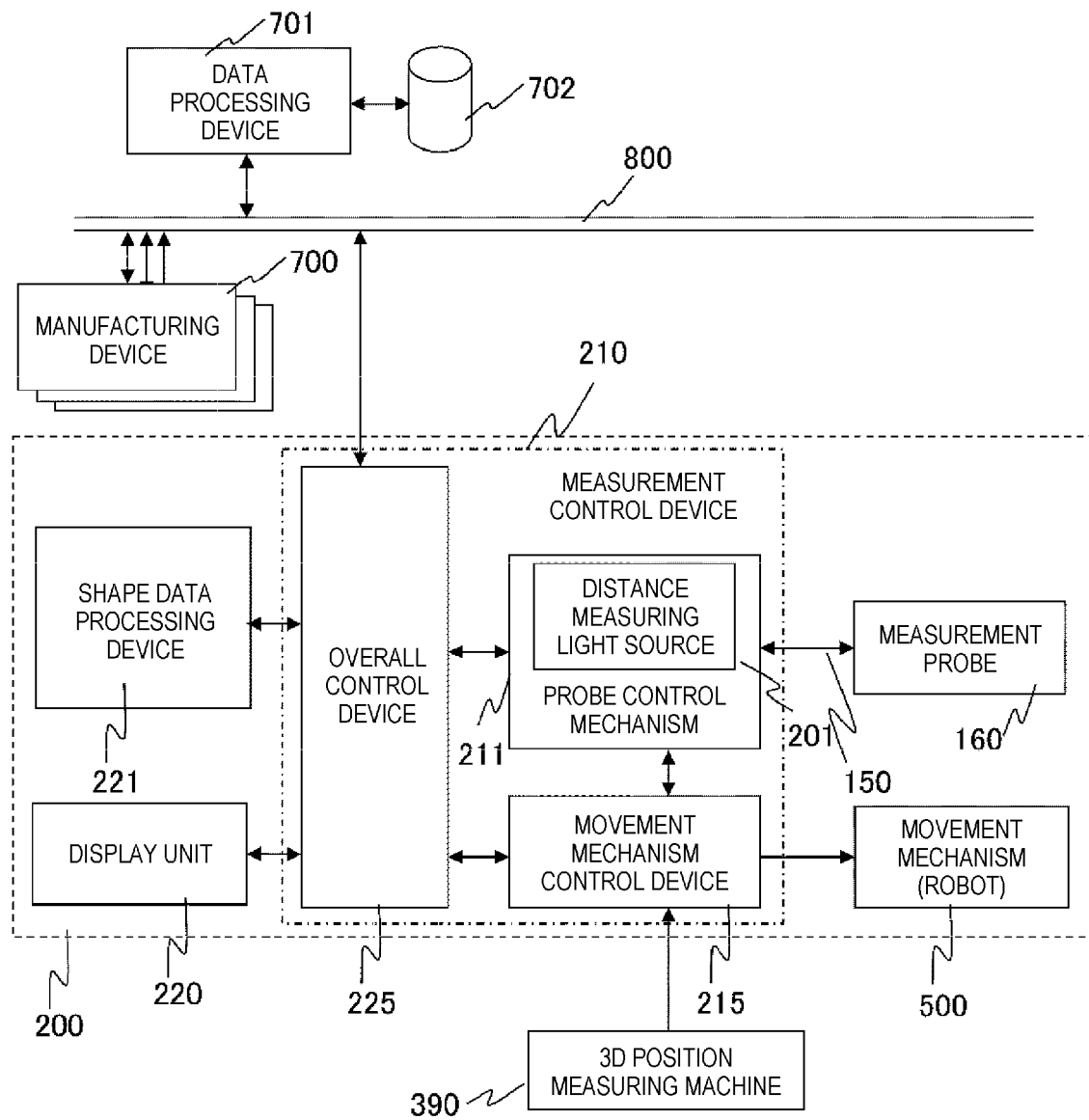

[FIG. 2]
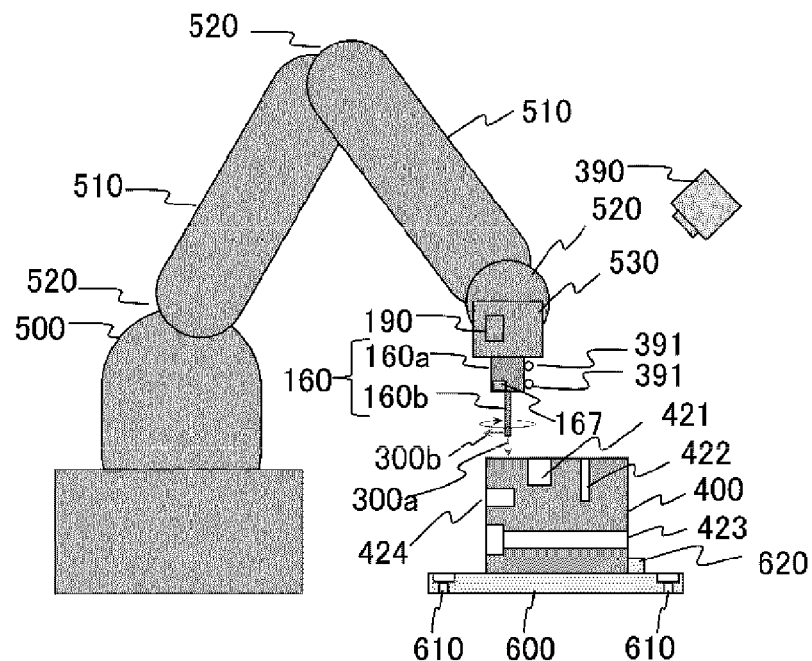
[FIG. 3]
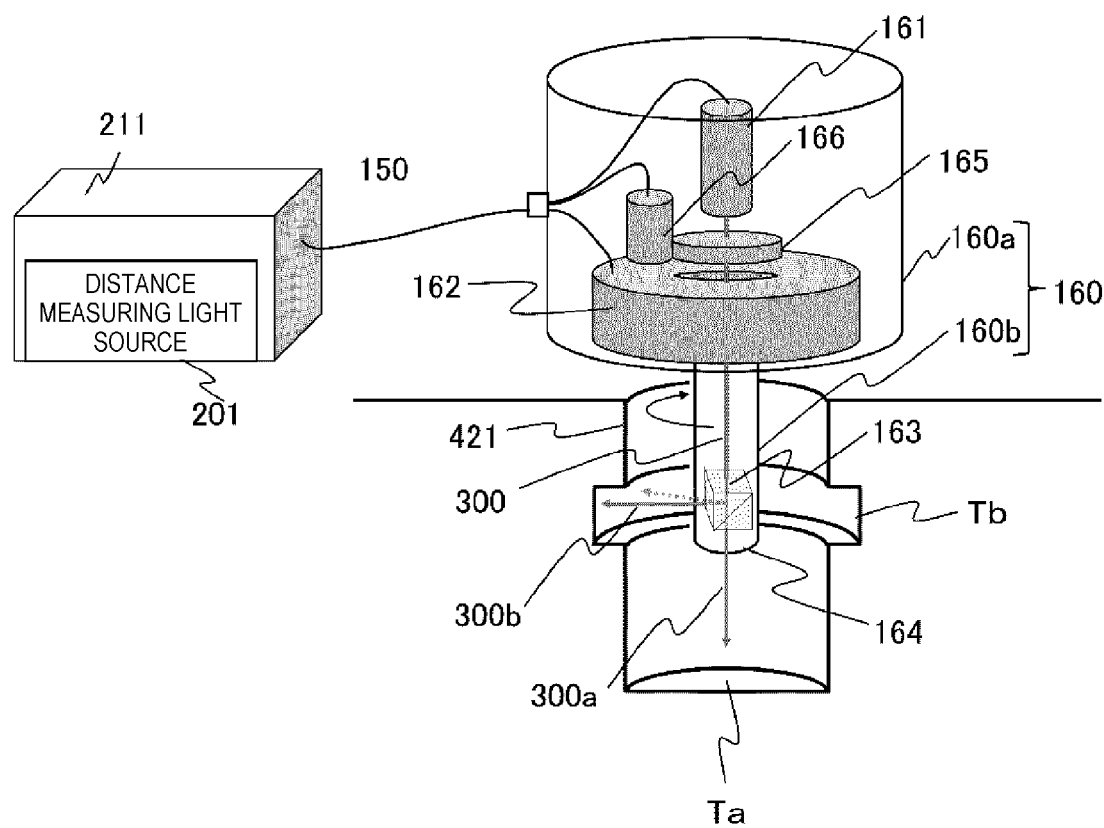

[FIG. 4]
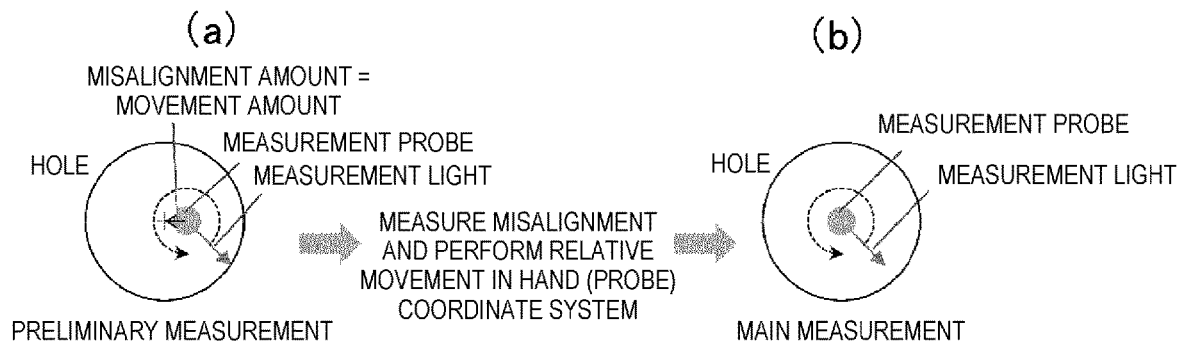
[FIG. 5]
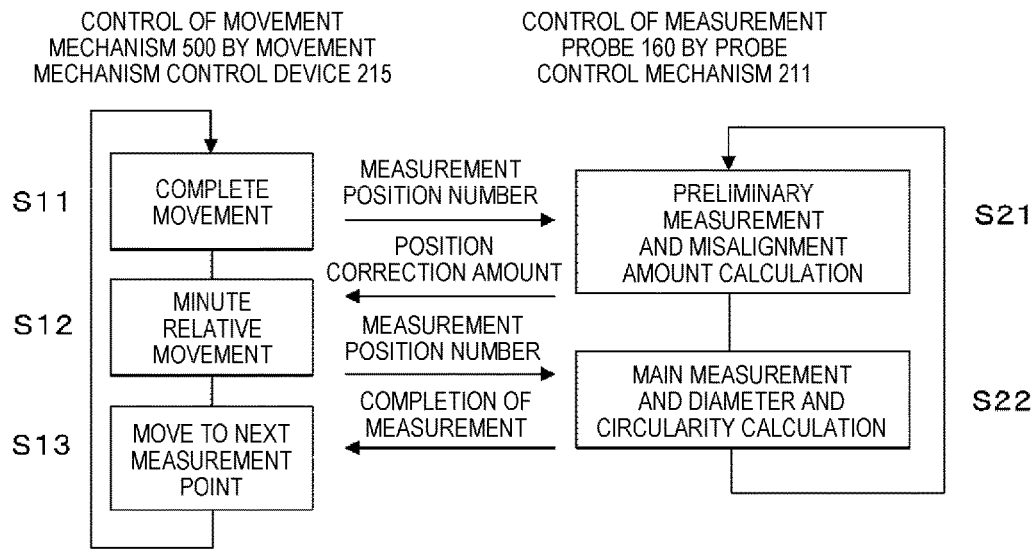

[FIG. 6]
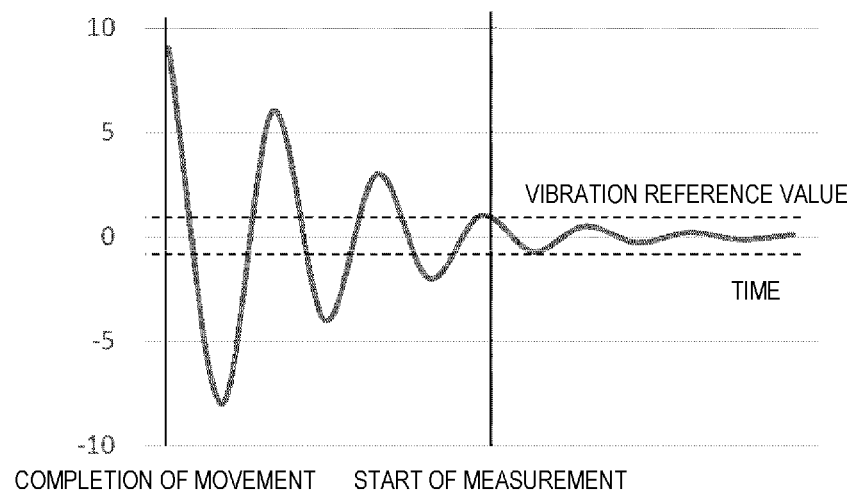
[FIG. 7]
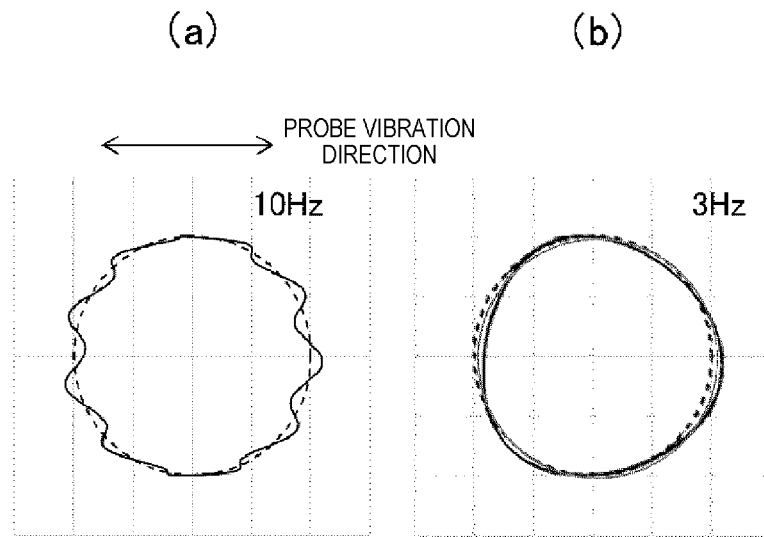

[FIG. 8]
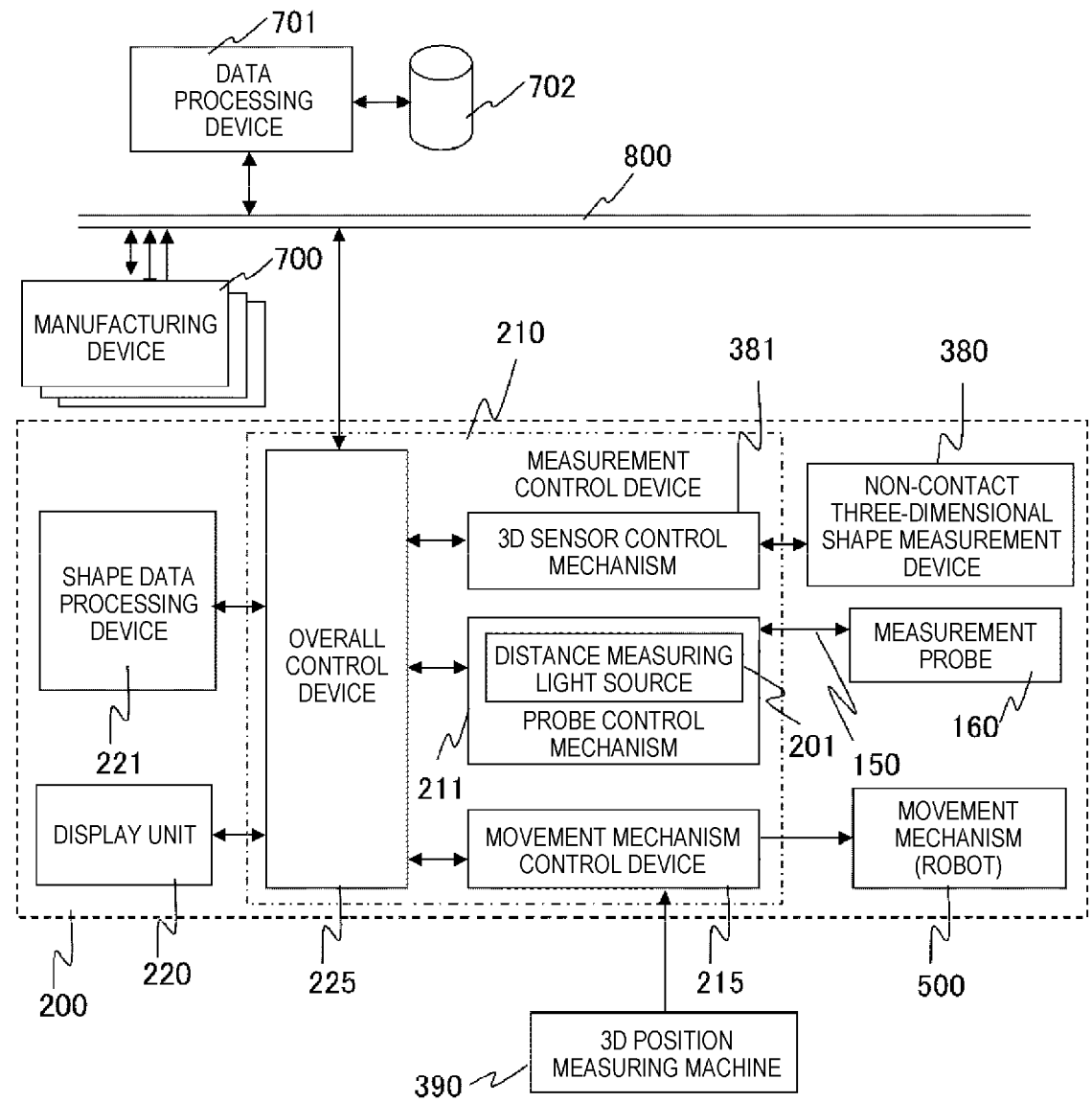

[FIG. 9]
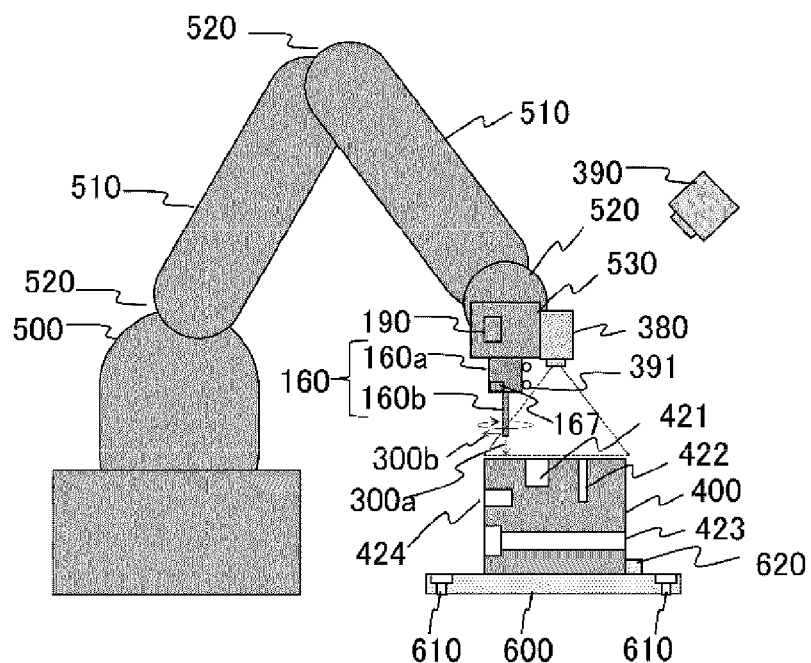

[FIG. 10]
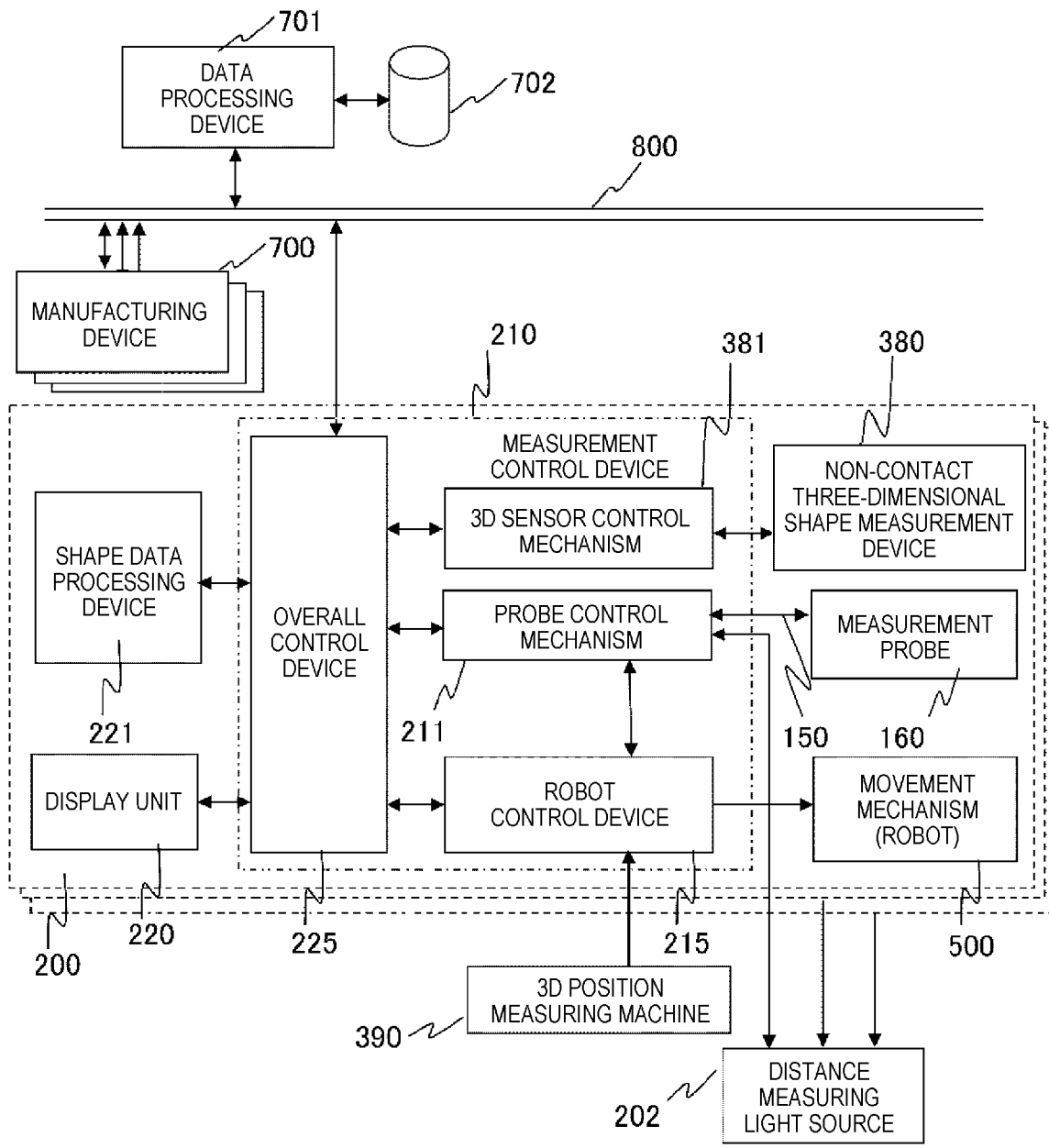

[FIG. 11]
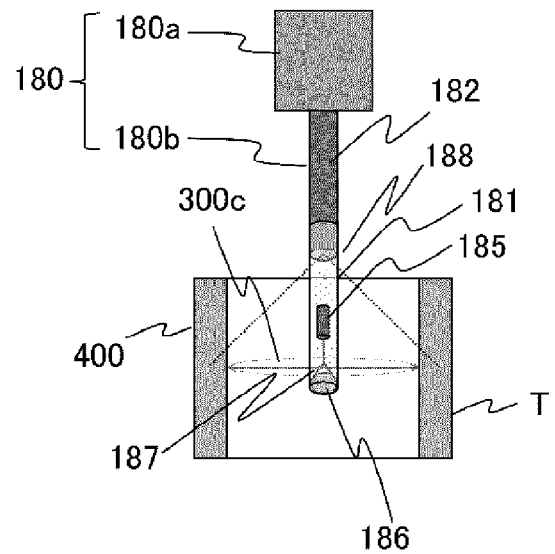
[FIG. 12]
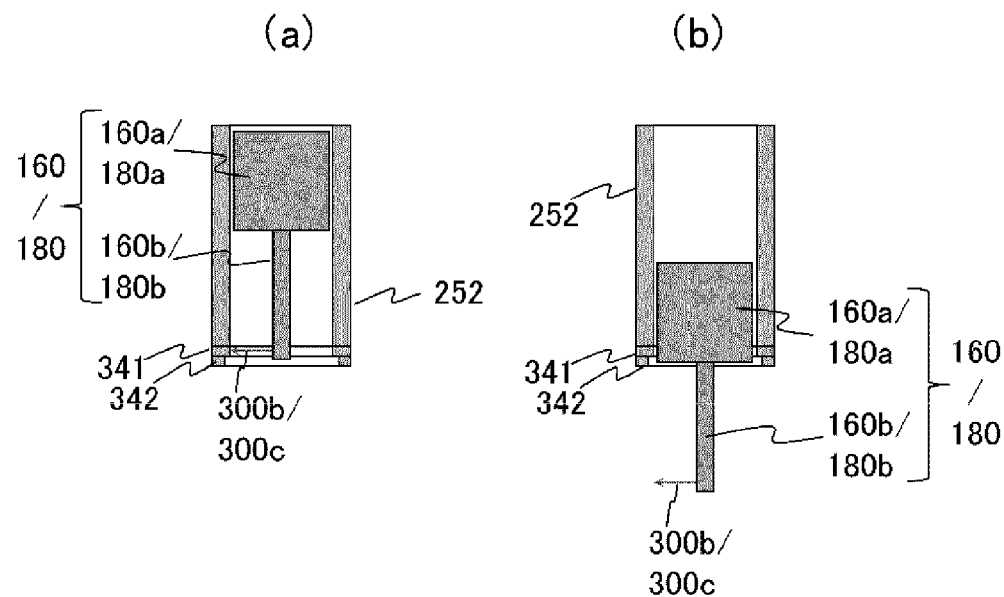

SHAPE MEASURING AND VIBRATION DETECTION

TECHNICAL FIELD

The present invention relates to a shape measuring technique for measuring a three-dimensional shape. The invention claims priority of Japanese Patent Application No. 2020-093416, filed on May 28, 2020, and regarding the designated countries that are permitted to be incorporated by reference in the literature, the content of that application will be incorporated into the present application by reference.

BACKGROUND ART

PTL 1 discloses a technique for measuring a three-dimensional shape. That is, paragraph [0008] in PTL 1 discloses that "A distance measuring apparatus includes: a light emitting unit configured to output measurement light; a polarization state control unit configured to control polarization of the measurement light output from the light emitting unit; and an optical path switching element configured to selectively emit the measurement light controlled by the polarization state control unit, in which the polarization state control unit controls polarization such that the measurement light is emitted from the optical path switching element to a plurality of directions, and the optical path switching element captures reflected light used for measuring a distance to an object, the reflected light being reflected light of the measurement light emitted from the optical path switching element with respect to the object." In addition, paragraph [0074] in PTL 1 discloses that "It is possible to configure the three-dimensional shape measuring apparatus 20 capable of performing a measurement with a higher degree of freedom by installing the measurement probe 160 according to the present embodiment on a multi-degree-of-freedom robot and moving the measurement probe tip end portion 164."

CITATION LIST

Patent Literature

PTL 1: Japanese Patent No. 6513846

SUMMARY OF INVENTION

Technical Problem

In the technique disclosed in PTL 1, when positional accuracy of a movement mechanism such as a robot for moving a probe in a plurality of directions is insufficient, an error may occur in a three-dimensional shape to be measured. In particular, insufficient positional accuracy is likely to occur in shape measurement of a narrow portion.

An object of the invention is to provide a technique capable of measuring a shape of an object while maintaining accuracy even when positional accuracy of a mechanism configured to move a probe is insufficient.

Solution to Problem

The present application includes a plurality of portions for solving at least a part of the above problem, and examples thereof are as follows.

A shape measuring apparatus according to an aspect of the invention includes: a measurement probe configured to measure a distance from a portion to be measured of an object by irradiating the portion to be measured with measurement light; a movement mechanism configured to move the measurement probe; and a measurement control device configured to control an operation of the measurement probe and an operation of the movement mechanism, so as to perform a distance measurement on a plurality of portions to be measured of the object to perform a shape measurement. The measurement control device instructs the movement mechanism to move the measurement probe to a target position, measures the distance from the portion to be measured by the measurement probe, determines a position to which the measurement probe has actually moved, calculates an error between the position to which the measurement probe has actually moved and the target position, corrects the position of the measurement probe by the movement mechanism based on the calculated error, and causes the measurement probe to perform the distance measurement at a corrected position.

Advantageous Effects of Invention

According to the invention, it is possible to measure a three-dimensional shape with high accuracy even when a measurement probe mounted on a movement mechanism having relatively low cost and high flexibility, such as a robot, is used.

Problems, configurations, and effects other than those described above will become apparent based on the following description of an embodiment.

BRIEF DESCRIPTION OF DRAWINGS

FIG. 1 is a block diagram showing a system configuration of a shape measuring apparatus according to a first embodiment together with a configuration of peripheral devices connected to the shape measuring apparatus.

FIG. 2 is a diagram schematically showing an appearance of an example of the shape measuring apparatus according to the first embodiment.

FIG. 3 is a schematic diagram showing an example of a measurement probe used in the first embodiment.

FIG. 4 is a diagram conceptually showing a control procedure for performing a narrow portion shape measurement with high accuracy.

FIG. 5 is a diagram showing an example of a procedure for implementing a highly accurate measurement by correcting a position of the measurement probe using a measurement result by the measurement probe itself.

FIG. 6 is a diagram schematically showing a state of vibration of the measurement probe during the measurement.

FIG. 7 is a schematic diagram showing an influence of the vibration of the measurement probe on a measurement shape.

FIG. 8 is a block diagram showing a system configuration of a shape measuring apparatus according to a second embodiment together with a configuration of peripheral devices connected to the shape measuring apparatus.

FIG. 9 is a schematic diagram showing another example of a measurement probe used in the second embodiment.

FIG. 10 is a block diagram showing a system configuration of a shape measuring apparatus according to a third embodiment together with a configuration of peripheral devices connected to the shape measuring apparatus.

FIG. 11 is a diagram schematically showing an example of a measurement probe applicable to the embodiments described above, as a fourth embodiment.

FIG. 12 is a diagram schematically showing an example of a calibration mechanism applicable to the embodiments described above, as a fifth embodiment.

DESCRIPTION OF EMBODIMENTS

Hereinafter, a plurality of embodiments of the invention will be described with reference to the drawings. In all the drawings illustrating the embodiments, the same members are denoted by the same reference numerals in principle, and repetitive descriptions thereof will be omitted. In the following embodiments, it is needless to say that elements (including element steps and the like) are not necessarily essential unless otherwise particularly specified or clearly considered as essential in principle. It is needless to say that elements other than a certain element are not excluded except for the case where it is clearly specified that only the certain element should be employed. Similarly, in the following embodiments, shapes, positional relation, or the like of the elements or the like include those substantially approximate or similar to the shapes, the positional relation or the like unless otherwise particularly specified or when it is clearly considered that this is not the case in principle. In the description of the configuration of each embodiment, for the sake of understanding, an orthogonal coordinate system including X, Y, and Z axes is used. X and Y are directions constituting a horizontal plane, and Z is a vertical direction. As the matter of course, even when the configuration of each embodiment does not strictly coincide with the XYZ axes, changes within a range in which substantially the same operation and effect can be achieved are allowed.

First Embodiment

Hereinafter, an example of an embodiment of the invention will be described with reference to the drawings. FIG. 1 is a block diagram showing a system configuration of a shape measuring apparatus according to a first embodiment together with a configuration of peripheral devices connected to the shape measuring apparatus. FIG. 2 is a diagram schematically showing an appearance of an example of the shape measuring apparatus according to the first embodiment. FIG. 3 is a schematic diagram showing an example of a measurement probe used in the first embodiment.

As shown in FIG. 1, a shape measuring apparatus 200 according to the present embodiment includes a measurement probe 160, a movement mechanism 500, a measurement control device 210 that controls the measurement probe 160 and the movement mechanism 500 to perform a shape measurement on an object, a shape data processing device 221, and a display unit 220. In the present embodiment and other embodiments described below, a workpiece 400 (see FIG. 2) placed on a manufacturing device will be described as an example of an object whose shape is to be measured.

The measurement control device 210 includes a probe control mechanism 211, a movement mechanism control device 215, and an overall control device 225. The measurement control device 210 integrally controls entire shape measurement processing to measure a three-dimensional shape of a target to be measured. The overall control device 225 includes an arithmetic device including a central processing unit (CPU), a memory, and the like, which are not shown, as hardware resources. Various calculations, controls, and the like are performed by software installed in advance. Similarly, the probe control mechanism 211 and the movement mechanism control device 215 also have hardware resources and software. The shape data processing device 221 includes, for example, a graphics processing unit (GPU), shares the processing of the overall control device 225, and performs arithmetic processing on image data, shape data, and the like at high speed.

The overall control device 225 integrally controls a movement of the measurement probe 160 to each measurement point by the movement mechanism control device 215, and a measurement of the measurement probe 160 at each measurement point by the probe control mechanism 211, and calculates the three-dimensional shape of the object based on a position (target position) of each measurement point related to the target to be measured and data of a distance to each portion to be measured. In order to perform the measurement with high accuracy, the overall control device 225 causes the movement mechanism control device 215 and the probe control mechanism 211 to perform a preliminary measurement for detecting a deviation of the movement of the measurement probe 160 from the target position and a main measurement for correcting the deviation as necessary based on a result of the preliminary measurement and measuring a distance to the portion to be measured, thereby measuring the three-dimensional shape of the object (workpiece 400). In addition, the overall control device 225 can display the measurement result and the like on the display unit 220.

As shown in FIG. 2, the movement mechanism 500 holds the measurement probe 160 in a holding portion 530. The movement mechanism 500 moves the measurement probe 160 to the target position under the control of the movement mechanism control device 215 to cause the measurement probe 160 to approach the portion to be measured of the workpiece 400 from various positions and directions. As the movement mechanism 500, for example, an articulated robot as shown in FIG. 2 can be used. The articulated robot includes a plurality of arms 510, joint portions 520 that connect the arms 510 in a manner of displacing the arms 510, and an actuator (not shown) that freely displaces each arm. By using a robot such as an articulated robot as the movement mechanism, it is possible to move the measurement probe 160 in a free attitude according to the shape of the workpiece 400 while holding the measurement probe 160. Any other movement mechanism may be used as long as it is such a mechanism. For example, a multi-axis stage can be used.

The movement mechanism control device 215 performs a control to move the measurement probe 160 to the target position based on position information of each measurement point of the workpiece 400, which will be described later. That is, the movement mechanism control device 215 outputs an instruction to the movement mechanism 500 to move the measurement probe 160 to the target position. When the movement mechanism control device 215 receives information on the end of the distance measurement at the target position from the probe control mechanism 211, the movement mechanism control device 215 instructs the movement mechanism 500 to move the measurement probe 160 to a next measurement point. This procedure is repeated for each measurement point set on the workpiece 400. Each measurement point is assigned a measurement position number for sequentially managing the position to be measured between the control devices. The measurement position number is exchanged with the probe control mechanism 211 for each measurement point.

As position information of the measurement point, for example, design data of a product can be used. The movement mechanism control device 215 can use, for example, computer aided design (CAD) data related to the workpiece 400 as the design data. That is, the CAD data is read in advance, each measurement point is specified together with position coordinates, the measurement position number is assigned to each measurement point, and the measurement point data is used for a movement control of the movement mechanism 500. Of course, other means may be used as long as the measurement for each measurement point can be managed.

As shown in FIG. 3, the probe control mechanism 211 includes a distance measuring light source 201. Although not shown, the distance measuring light source 201 includes a light source element that outputs coherent light, for example, a laser diode, and a drive device for the laser diode. The drive device includes a drive circuit for outputting laser light, a circuit for performing modulation such as FM modulation on the laser light, and the like. The probe control mechanism 211 controls the distance measuring light source 201 to output the laser light for measurement.

The probe control mechanism 211 includes various optical members such as an optical fiber, an optical coupler, and an optical circulator, and a photoelectric conversion element. The probe control mechanism 211 splits the laser light output from the distance measuring light source 201 into measurement light and reference light. The measurement light is transmitted to the measurement probe 160 via a connection cable 150 having an optical fiber. Meanwhile, reflected light from the target to be measured is taken in via the measurement probe 160, combined with the reference light described above, photoelectrically converted, and subjected to distance detection processing. The probe control mechanism 211 transmits detected distance data to the overall control device 225 in association with, for example, the measurement position management number described above. The distance detection processing is described in, for example, PTL 1 described above.

The shape measurement is performed on a complicated shape such as an external shape, a groove portion, or a hole portion of a workpiece. For example, it may be necessary to measure an internal shape of each hole portion. FIG. 2 shows a cubic block having a shape in which hole portions 421, 422, 423, 424 are provided, as an example of the workpiece 400. It can be said that these hole portions 421, 422, 423, 424 correspond to so-called narrow portions. The measurement probe 160 can cope with the shape measurement of a workpiece including such a narrow portion.

FIG. 2 shows a case where the workpiece 400 is mounted at a predetermined position on a sample stage 600 and the shape measurement is performed. In this example, the workpiece 400 is locked to a positioning member 620. Accordingly, the workpiece 400 is fixed to a reference position on an XY plane of the sample stage 600.

When alignment marks 610 are formed on the sample stage 600 in advance, reference setting of a position on the sample stage 600 during the measurement can be easily performed using the marks 610. For example, by measuring two or more positions of the alignment marks 610 with the measurement probe 160, the position of the workpiece 400 placed on the sample stage 600 can be accurately obtained.

By using a characteristic shape of the workpiece 400 itself as a mark, a position and attitude of the workpiece 400 can be accurately obtained. For example, positions of three surfaces surrounding a corner may be measured at a plurality of corners with measurement light traveling in a first direction 300*a* or a second direction 300*b*, and the position and attitude of surfaces that are not orthogonal to each other may be measured at three or more points per surface with the measurement light traveling in the first direction 300*a* or the second direction 300*b*.

By performing such a positioning measurement, the position and attitude of the workpiece 400 on the sample stage 600 can be accurately obtained. Once position and attitude information of the workpiece 400 is obtained, the CAD data of the workpiece 400 can be used to control the approach to the portion to be measured at the target position on the workpiece 400. That is, the movement mechanism control device 215 reads the CAD data in advance, and controls the movement mechanism 500 using the CAD data to cause the measurement probe 160 to approach the portion to be measured at the target position on the workpiece 400 to be measured.

As shown in FIG. 3, the measurement probe 160 includes a probe main body 160*a* and a head 160*b* located on a tip end side thereof. In the measurement probe 160, the probe main body 160*a* is held by the holding portion 530 of the movement mechanism 500 described above. With this movement mechanism, in addition to the movement to the target position, the attitude is changed and maintained so as to be in a predetermined direction with respect to the portion to be measured. Meanwhile, the head 160*b* approaches a target to be measured, which is close to the workpiece 400, and performs distance detection. The measurement probe 160 is moved to the target position on the workpiece 400 by the movement mechanism 500 under the control of the movement mechanism control device 215. Further, the head 160*b* is moved toward a portion T to be measured in a state of being inserted into the hole portion 421 at the target position.

As shown in FIG. 3, the probe main body 160*a* accommodates a lens system 161, a rotation mechanism 162, a polarization state control unit 165, and a polarization state control unit drive device 166. The optical fiber provided in the connection cable 150 is connected to the lens system 161, and the measurement light guided from the connection cable 150 is narrowed and guided to the polarization state control unit 165. Meanwhile, reflected light from the target to be measured, that has passed through the polarization state control unit 165, is guided to the connection cable 150. As shown in FIG. 3, the rotation mechanism 162 and the polarization state control unit drive device 166, and the probe control mechanism 211 are connected via a conductive wire used as a signal line, a power line, or the like. In the present embodiment, the conductive wire is bundled together with the optical fiber as the connection cable 150. A strain gauge 167 is attached to the probe main body 160*a* (see FIG. 2). Further, a strain gauge 190 is attached to the holding portion 530 of the movement mechanism 500 (see FIG. 2). A wireless communication unit may be used for signal transmission, including transmission between other devices.

As shown in FIG. 3, the head 160*b* has, for example, a tubular shape, and holds the optical path switching element 163 on at least a part of an inner wall thereof. The head 160*b* needs to have a property of transmitting the measurement light on an emission side of the optical path switching element 163 in the first direction 300*a* and over the entire circumference of a circle with a radius in the second direction 300*b*. The optical path switching element 163 can be implemented by using, for example, a polarization beam splitter. The measurement probe 160 has a tubular shape that accommodates the optical path switching element 163, and thus can be formed to be extremely thin. Therefore, the measurement probe 160 can be easily inserted into a hole, a groove, or the like, and it is easy to measure a distance in a narrow portion.

The configuration of the head 160b is not limited thereto. For example, the optical path switching element 163 may be locked by one or more support columns, and the optical path switching element 163 may be rotated in accordance with the rotation of the support columns. In addition, the head 160b may be formed of, for example, a transparent two-layered cylinder, and may be configured such that the optical path switching element 163 is locked by an inner cylinder and the optical path switching element 163 is rotated.

The polarization state control unit 165 includes an element that changes the polarization state of incident light, for example, a polarization element such as a polarizing plate. The polarization element is rotationally driven by the polarization state control unit drive device 166 under the control of the probe control mechanism 211. In accordance with angular displacement caused by the rotation, the polarization state control unit 165 controls polarization of measurement light output from a distance measurement control mechanism 110. The polarization state control unit 165 may be other units capable of changing the polarization state. For example, a liquid crystal element can be used.

As shown in FIG. 3, the lens system 161 narrows measurement light output from the probe control mechanism 211 and guided to the connection cable 150 and guides the narrowed measurement light to the polarization state control unit 165. The polarization state control unit 165 changes the polarization state of the guided measurement light so as to be light to be transmitted through the optical path switching element 163 or light to be reflected by the optical path switching element 163. Accordingly, in the optical path switching element 163, an optical path 300 of the measurement light is selectively switched between an optical path 300a in the same direction as the optical path 300 and an optical path 300b in a direction orthogonal to the optical path 300 according to the change in the polarization state of the measurement light.

The rotation mechanism 162 includes a drive mechanism such as a motor, and rotates the head 160b around the optical path 300 of the measurement light emitted from the lens system 161 as an axis under the control of the probe control mechanism 211. Accordingly, the optical path switching element 163 held by the head 160b is rotated around the optical axis of the optical path 300. As a result, as shown in FIG. 3, a radiation direction of measurement light reflected in the direction of the optical path 300b by the optical path switching element 163 turns as shown by an arrow in FIG. 3 along with the rotation of the optical path switching element 163. Accordingly, the inside of the portion T to be measured of the hole portion 421 in the workpiece 400 is scanned by turning the radiation direction of the measurement light.

Referring to FIG. 1, the overall control device 225 controls the movement mechanism 500 via the movement mechanism control device 215, and at the same time, controls the distance measuring light source 201 and the measurement probe 160 via the probe control mechanism 211 to perform a three-dimensional shape measurement. In addition, the overall control device 225 transfers, to the shape data processing device 221, position and attitude data of the measurement probe 160 related to the movement by the movement mechanism 500, which is obtained from the movement mechanism control device 215, and distance measurement data by the measurement probe 160, which is obtained from the probe control mechanism 211, for each measurement point of the workpiece 400, and synthesizes the overall three-dimensional shape information of the workpiece 400. The overall control device 225 shares the control functions of the probe control mechanism 211 and the movement mechanism control device 215, but the way of sharing can be changed. Further, the overall control device 225 may be configured to control all of the devices. With respect to this point, even when a 3D sensor control mechanism 381 to be described later is added, the way of sharing can be changed in the same manner.

The distance measurement data of the workpiece 400, which is obtained by the measurement probe 160, is relative data with respect to the position and attitude of the measurement probe 160 during the measurement. The overall control device 225 causes the shape data processing device 221 to perform processing on these pieces of data. The shape data processing device 221 calculates the position and attitude of the measurement probe 160 during the measurement based on the position and attitude data of the movement mechanism 500, transforms the position and attitude into a reference coordinate system, and synthesizes the three-dimensional shape information. Further, the shape data processing device 221 analyzes the obtained overall three-dimensional shape information of the workpiece 400 or the three-dimensional shape information of each narrow portion, and calculates an error with respect to design information. For example, it is possible to calculate dimension information such as a hole diameter and a hole pitch, and to calculate geometric tolerance information such as cylindricity, straightness, and flatness. The overall control device 225 displays the calculated result on the display unit 220. All or a part of the calculation processing of the shape data processing device 221 may be executed by the overall control device 225.

As shown in FIG. 1, the shape measuring apparatus 200 can be connected to a manufacturing device 700 and a data processing device 701 via a network 800 to construct a manufacturing system. Accordingly, the shape measuring apparatus 200 can be used for management of the manufacturing device 700 by transmitting measurement data via the network 800. Specifically, the measurement data is transmitted to the data processing device 701 and stored in a storage device 702. The data processing device 701 analyzes an error in the shape measurement result, and outputs, via the network 800, various instructions based on the analysis result to the manufacturing device 700 that has processed the workpiece 400. Examples of the various instructions include a tool replacement instruction, a tool size correction amount instruction, and an instruction to change processing conditions such as a processing path and a processing speed. In addition, an instruction to change a finishing amount may be given to the manufacturing device 700 that processes the workpiece 400 next. Further, in consideration of shape errors of both a workpiece to be assembled and a counterpart to be assembled, an assembly step for assembling the workpiece 400 can be instructed to employ a counterpart to be assembled such that the workpiece to be assembled and the counterpart to be assembled can be precisely fitted to each other and are optimum to each other. It is needless to say that the data processing device 701 and the storage device 702 may be installed in a cloud instead of being connected to the private network 800.

Next, an operation example of the present embodiment will be described. First, an example of a role of the probe control mechanism 211 will be described together with a relationship between the distance measuring light source 201 and the measurement probe 160. The distance measuring light source 201 outputs, for example, coherent laser light modulated by a sweep waveform signal generated by a built-in oscillator. The laser light is transmitted to the probe control mechanism 211 via the optical fiber. The probe control mechanism 211 splits the laser light into reference light and measurement light, and guides the measurement light to the lens system 161 of the probe main body 160a of the measurement probe 160 via the connection cable 150.

The movement mechanism control device 215 issues an instruction to the movement mechanism 500 to move the measurement probe 160 to the target position. For example, when measuring the hole portion 421 of the workpiece 400 shown in FIG. 2, the measurement probe 160 is moved to a center position of the hole portion 421. Further, as shown in FIG. 3, the head 160b of the measurement probe 160 is inserted into the hole portion 421. When the movement is completed, the movement mechanism control device 215 transfers the measurement position number to the probe control mechanism 211 and starts the measurement.

The probe control mechanism 211 outputs measurement light. The measurement light reaches the polarization state control unit 165 via the connection cable 150 and the lens system 161, and the polarization of the measurement light is controlled by the polarization state control unit 165. The measurement light controlled by the polarization state control unit 165 reaches the optical path switching element 163.

As shown in FIG. 3, when the portion to be measured has a cylindrical shape, a bottom depth at a cylindrical portion Ta to be measured can be measured by using measurement light emitted in the first direction 300a under the polarization control of the polarization state control unit 165. Meanwhile, a radiation direction of light emitted from the optical path switching element 163 in the second direction 300b under the polarization control of the polarization state control unit 165 is angularly displaced in accordance with the rotation of the optical path switching element 163, and the light is transmitted through an opening or a wall surface of a side surface of the head 160b to incident on a portion Tb to be measured. Similar to the light emitted in the first direction 300a, reflected light from the portion Tb to be measured travels backward along the path and reaches the probe control mechanism 211, and a distance to the portion Tb to be measured is calculated. By using the measurement light emitted in the second direction 300b, for example, a shape of a side surface of a cylindrical shape can be measured. When the measurement is completed, the probe control mechanism 211 reports the completion of the measurement to the movement mechanism control device 215. Accordingly, the movement mechanism control device 215 moves the measurement probe 160 to a next measurement point.

Next, an example of a measurement in a narrow portion will be described. FIG. 4 conceptually shows a control procedure for performing a narrow portion shape measurement with high accuracy. As shown in (a) in FIG. 4, the measurement probe 160 radially emits measurement light to measure a distance, so that factors such as light reflection characteristics influence the accuracy. Therefore, as for a position of the measurement probe 160, it is more accurate to insert the measurement probe 160 as close as possible to a center of a narrow portion (in particular, a hole) to perform the measurement. However, the absolute position accuracy of the movement mechanism 500 is generally about 1 mm in the case of a robot, for example. Therefore, in the present embodiment, as shown in FIG. 4, a preliminary measurement and a main measurement are performed. Accordingly, a hole shape measurement with high accuracy can be implemented.

First, as shown in (a) in FIG. 4, a head of a measurement probe is inserted into a hole to perform the preliminary measurement to obtain a center position of the hole, that is, a deviation amount is obtained as a movement amount. Next, the measurement probe 160 is relatively moved in a probe coordinate system in a direction in which the deviation is canceled by the obtained movement amount. As shown in (b) in FIG. 4, the main measurement is then performed. In this way, by performing the preliminary measurement in advance and correcting the deviation, the position of the head of the measurement probe 160 becomes closer to the center of the hole. By performing the measurement in this state, the hole shape can be measured with high accuracy.

An operation flow for performing the preliminary measurement and the main measurement described above in the shape measuring apparatus will be described with reference to FIG. 5. FIG. 5 is a diagram showing an example of a procedure for implementing a highly accurate measurement by correcting a position of a measurement probe using a measurement result by the measurement probe itself. These measurements are performed by the movement mechanism control device 215 and the probe control mechanism 211 under the control of the overall control device 225 in the measurement control device 210 shown in FIG. 1. In FIG. 5, the operation flow of the movement mechanism control device 215 is shown on the left side, and the operation flow of the probe control mechanism 211 is shown on the right side.

The movement mechanism control device 215 issues an instruction to the movement mechanism 500 to move the probe 160 to the center position of the hole, and when the movement is completed, the movement mechanism control device 215 transfers the measurement position number to the probe control mechanism 211 (S11). In response to this, the probe control mechanism 211 performs the preliminary measurement and calculates the deviation amount based on the measurement result (S21). The probe control mechanism 211 fits a circle to measurement point group data of a measurement cross section in the measurement result, and calculates the deviation amount from a center position of the fitted circle. The probe control mechanism 211 transfers the calculated deviation amount to the movement mechanism control device 215 as a position correction amount.

The movement mechanism control device 215 controls the movement mechanism 500 to perform a minute relative movement by a movement amount corresponding to the received correction amount in a hand (probe) coordinate system. Upon completion, the measurement position number is transferred to the probe control mechanism 211 again (S12). The probe control mechanism 211 controls the measurement probe 160 to perform the main measurement for obtaining a hole diameter, circularity, and the like. When the measurement is completed, the probe control mechanism 211 reports the completion of the measurement to the movement mechanism control device 215 (S22).

The movement mechanism control device 215 moves the measurement probe 160 to a next measurement point (S13). By repeating the above procedure, the shape of the workpiece 400 having a plurality of narrow portions can be automatically measured.

When the deviation amount is small and the desired accuracy is satisfied during the preliminary measurement, the probe control mechanism 211 sets the measurement result of the preliminary measurement as the measurement result of the main measurement, and reports the completion of the measurement to the movement mechanism control device 215 (S22). The movement mechanism control device 215 moves the measurement probe 160 to a next measurement point by the movement mechanism 500 without performing the minute relative movement for position correction.

Another example for implementing the highly accurate shape measurement by compensating for accuracy of a position and attitude of a tip end portion of the movement mechanism 500 will be described. In this example, a reference sample in which a position of each portion to be measured is known is prepared in advance. For example, a reference sample in which a position corresponding to each portion to be measured such as the hole portions 421, 422, 423, and 424 of the workpiece 400 shown in FIG. 2 is known is prepared. Next, the workpiece 400 to be measured is measured by the measurement probe 160. The overall control device 225 and the shape data processing device 221 analyze the measurement results and calculate the positions of the hole portions 421, 422, 423, and 424 as respective portions to be measured. Based on a deviation between this position and the position of each portion to be measured, which is known in advance, it is possible to obtain correction amount data for correcting the deviation generated when the measurement probe 160 has been moved by the movement mechanism 500. The correction amount data is stored in advance in a storage device (not shown). For example, the correction amount data is recorded and held as a correction table in the overall control device 225. Next, the measurement data of the measured position is corrected using the correction table.

In this way, by recording the correction table created by measuring the reference sample in advance, it is possible to correct a position error in the movement of the measurement probe with respect to the same type of workpiece using the correction table. Accordingly, it is possible to cope with the highly accurate shape measurement in a manufacturing line or the like. When the shape of the reference sample is different from the shape of the workpiece 400 and the position of the portion to be measured is different, data in the correction table cannot be used as it is. In such a case, correction is performed using correction data close in the position and attitude. In the case of using a plurality of pieces of neighboring correction data, interpolation is performed by weighting according to closeness between the position and attitude of the measurement probe when correction data is obtained and the position and attitude of the measurement probe when correction target data is obtained.

Another example of securing the position and attitude accuracy in the present embodiment will be described. The accuracy of the position and attitude of the tip end portion of the movement mechanism 500 such as a robot is generally about 1 mm. However, with this accuracy, it is often insufficient to measure a position of a narrow portion with respect to a reference surface (datum surface) of the workpiece 400, and an interval between the plurality of narrow portions 421 and 422, and the like with high accuracy. Therefore, in the present embodiment, as shown in FIG. 2, a plurality of target marks 391 are attached to a side surface of the probe main body 160a of the measurement probe 160, and three-dimensional positions of these marks are measured by using a 3D position measuring machine 390 installed outside. The 3D position measuring machine 390 functions as a sensor capable of measuring the position and attitude of the measurement probe 160 from the outside. As will be described later, the movement mechanism control device 215 corrects the movement position of the probe based on the output of the sensor.

As shown in FIG. 1, the 3D position measuring machine 390 is connected to the movement mechanism control device 215. The movement mechanism control device 215 recognizes the target marks 391 from an image taken by the 3D position measuring machine 390, and determines positions of the target marks 391. Accordingly, the movement mechanism control device 215 can accurately obtain the position and attitude of the measurement probe 160 with accuracy in the order of several tens of μm. As a result, by correcting the position and attitude of the measurement probe 160, a positional relationship between the plurality of measured narrow portions can be measured with high accuracy.

When performing the shape measurement, a possibility that the head 160b of the measurement probe 160 erroneously collides with the workpiece due to an error in the CAD data, a position error of the movement mechanism 500, or the like cannot be completely denied. As a measure to prevent this, for example, in the present embodiment, the probe control mechanism 211 and the movement mechanism control device 215 perform a control in cooperation with each other to avoid a collision. For example, the collision can be avoided by repeatedly switching a traveling direction of the measurement light emitted from the measurement probe 160 between the first direction 300a and the second direction 300b and performing a control such that the distance from the workpiece 400 does not become equal to or less than a predetermined distance. When the collision avoidance control is performed, the overall control device 225 may display, on the display unit 220, a message indicating that the collision avoidance has been performed.

As another method, there is a method of using the strain gauge 167 disposed in the measurement probe 160 or the strain gauge 190 disposed in the holding portion 530 of the movement mechanism 500 of the measurement probe 160. That is, an impact caused by a tip end portion 164 of the head 160b coming into contact with the workpiece 400 is sensed by the strain gauge 167 or the strain gauge 190, and the movement mechanism control device 215 performs a control to immediately stop the operation of the movement mechanism 500 and to retract the movement mechanism 500 in accordance with the sensing signal. This makes it possible to skip the measurement at that position, avoid the collision, and automatically measure the three-dimensional shape of the workpiece having a shape including various narrow portions. When the measurement is skipped, the overall control device 225 may display this information about the measurement point on the display unit 220. Accordingly, the measurement point can be measured again later by a manual operation or the like.

When performing the shape measurement, residual vibration may occur in the measurement probe 160. For example, when the movement mechanism 500 is moved to and stopped at a target position, the residual vibration may occur in the arm 510, for example. FIG. 6 shows a state of vibration with a horizontal axis representing time and a vertical axis representing displacement. Since the vibration attenuates with time, it is necessary to start the measurement after waiting until the residual vibration is equal to or less than a vibration reference value. When the residual vibration is equal to or less than the vibration reference value, the probe control mechanism 211 causes the measurement probe 160 to start the distance measurement. Accordingly, it is possible to prevent the accuracy from being lowered due to the influence of the residual vibration generated in the measurement probe.

In order to determine that the residual vibration is equal to or less than the reference value, various methods are considered. For example, a method of monitoring an output of the strain gauge 167 or the strain gauge 190, a method of capturing vibration by an acceleration sensor (not shown) attached to the vicinity of the measurement probe 160, or a method of capturing a vibrational change in a distance from the workpiece 400 by the measurement probe 160 itself may be considered. As another method, residual vibration characteristics may be measured in advance to determine a time until the residual vibration is equal to or less than the reference value.

Here, the residual vibration reference value can be determined as described below. For example, when the measurement of the hole portion 421 of the workpiece 400 as shown in FIG. 3 is performed while the measurement probe 160 is vibrating, the vibration is measured in a superimposed manner. For example, when measuring a circular hole as indicated by a broken line in (a) and (b) in FIG. 7, vibration is measured in a superimposed manner, and the shape is measured in a distorted manner as indicated by a solid line in (a) and (b) in FIG. 7. Here, (a) in FIG. 7 shows a measurement result in the case where the residual vibration is 10 Hz when the measurement of the measurement probe 160 is performed with a turning speed of the measurement light set to 1 second/rotation. Further, (b) in FIG. 7 shows a measurement result in the case where the residual vibration is 3 Hz. A vibration wave diagram shown in FIG. 6 and diagrams showing the shape distortion shown in (a) and (b) in FIG. 7 may be displayed on the display unit 220 by, for example, the overall control device 225.

The shape measurement accuracy when such vibration is superimposed on the measurement probe 160 is substantially equal to a vibration amplitude. Therefore, it is sufficient to set the vibration reference value to a value substantially equal to necessary shape measurement accuracy, and determine a measurement start timing as described above.

More preferably, the following can be performed. When a target desired to be measured is not a shape but, for example, a shape evaluation value such as a hole diameter or a hole position, processing of fitting a circle to the obtained cross-sectional shape data (fitting) is performed. For example, the position and the diameter of the circle are determined such that a sum of squares of the distances between the circle and points of the cross-sectional shape data is minimized. As a result, the obtained diameter and position become a desired shape evaluation value. In this case, even when the residual vibration remains to some extent, the shape evaluation value can be obtained with higher accuracy than the vibration amplitude when a vibration period is sufficiently shorter than a measurement time.

As in the example shown in (a) in FIG. 7, when the vibration period is about 1/10 of the measurement time of 1 second, the shape evaluation value can be expected to be about 1/10 of the vibration amplitude. Therefore, a value of about 10 times the necessary evaluation accuracy can be set as the vibration reference value which is a reference for vibration stabilization. On the other hand, as in the example shown in (b) in FIG. 7, when the vibration period is about 1/3 of the measurement time of 1 second, the shape evaluation value is substantially equal to the vibration amplitude. In this case, a value substantially equal to the necessary evaluation accuracy is set as a vibration reference value which is a reference for vibration stabilization.

The first embodiment has been described above. According to the first embodiment, the instruction to move the probe to the target position is transmitted to the movement mechanism, the measurement light is transmitted from the measurement probe to the portion to be measured of the target to be measured at a movement destination, the reflected light from the portion to be measured is received via the measurement probe to measure the distance, thereby performing the preliminary measurement for obtaining the error between the actual position of the probe and the target position. Thereafter, based on the error, the position of the measurement probe is moved by the movement mechanism to perform the main measurement for measuring the portion to be measured. Accordingly, the positional deviation of the measurement probe by the movement mechanism can be corrected, and the shape measurement can be performed with high accuracy. Even when the accuracy of position control by the movement of the movement mechanism is low, the measurement can be performed with desired accuracy.

Second Embodiment

FIG. 8 is a block diagram showing a system configuration of a shape measuring apparatus according to a second embodiment together with a configuration of peripheral devices connected to the shape measuring apparatus. FIG. 9 is a schematic diagram showing another example of a measurement probe used in the second embodiment.

The shape measuring apparatus 200 according to the present embodiment includes the measurement probe 160, the movement mechanism 500, a non-contact three-dimensional shape measurement device 380, the measurement control device 210, the shape data processing device 221, and the display unit 220. Here, the measurement control device 210 includes the probe control mechanism 211, the movement mechanism control device 215, the overall control device 225, and the 3D sensor control mechanism 381. The 3D position measuring machine 390 connected to the movement mechanism control device 215 is provided in the vicinity of an operation range of the movement mechanism 500. Since the basic configuration of the present embodiment is the same as the configuration of the first embodiment, the same components are denoted by the same reference numerals. In the present embodiment, the non-contact three-dimensional shape measurement device 380 and the 3D sensor control mechanism 381 are added. Here, the difference will be mainly described.

As shown in FIG. 9, in the present embodiment, the non-contact three-dimensional shape measurement device 380 is mounted on the movement mechanism 500. The non-contact three-dimensional shape measurement device 380 is attached to the holding portion 530 of the movement mechanism 500, and is connected to the 3D sensor control mechanism 381 via a signal line (not shown). As the non-contact three-dimensional shape measurement device 380, for example, a stereo camera, a combination of a stripe pattern projection device and a camera, a combination of a laser sheet light projection device and a camera, a time of flight (TOF) camera that measures a time until light returns to each pixel of a camera by blinking a flash, or the like is used.

The 3D sensor control mechanism 381 performs an imaging control of the non-contact three-dimensional shape measurement device 380. The non-contact three-dimensional shape measurement device 380 and the 3D sensor control mechanism 381 share a measurement regarding a surface shape of a target to be measured. That is, the shape measurement is performed by combining measurement results of the measurement probe 160 which is good at measuring a shape of a narrow portion and the non-contact three-dimensional shape measurement device 380 which is good at measuring other surface shapes. As a result, shape data of an outer surface shape and the narrow portion of the workpiece 400 to be measured can be obtained with desired accuracy without causing measurement point missing due to difficulty in measurement of the portion to be measured.

In the present embodiment, the overall control device 225 controls the movement mechanism 500 via the movement mechanism control device 215, and at the same time, controls the distance measuring light source 201 and the measurement probe 160 via the probe control mechanism 211, thereby mainly performing the 3D shape measurement of the narrow portion. Further, the non-contact three-dimensional shape measurement device 380 is controlled via the 3D sensor control mechanism 381 to mainly measure the surface shape of a portion other than the narrow portion. The overall control device 225 transfers, to the shape data processing device 221, position and attitude information of the movement mechanism 500, which is obtained from the movement mechanism control device 215, distance data of each measurement point by the measurement probe 160, which is obtained from the probe control mechanism 211, and 3D data by the non-contact three-dimensional shape measurement device 380, which is obtained from the 3D sensor control mechanism 381, and combines the overall three-dimensional shape information of the workpiece 400.

Here, as described above, the measurement data regarding the shape of the workpiece 400, which is obtained by the measurement probe 160 and the non-contact three-dimensional shape measurement device 380, is relative data with respect to the position and attitude during the measurement by the measurement probe 160 and the non-contact three-dimensional shape measurement device 380. Therefore, the shape data processing device 221 calculates the position and attitude during the measurement by the measurement probe 160 and the non-contact three-dimensional shape measurement device 380 based on the position and attitude of the movement mechanism 500, transforms the 3D shape data into a reference coordinate system, and combines the overall 3D information of the workpiece 400. Further, the shape data processing device 221 analyzes the obtained overall 3D information of the workpiece 400 or the 3D information of each narrow portion, and performs various calculations. For example, an error from the design information, dimension information such as a hole diameter and a hole pitch, geometric tolerance information such as cylindricity, straightness, and flatness, and the like are calculated. In addition, the calculated result is displayed on the display unit 220.

In the present embodiment, the 3D sensor control mechanism 381 obtains the shape data of the workpiece 400 by the non-contact three-dimensional shape measurement device 380, and aligns the measurement shape data with the CAD data of the workpiece 400 read in advance. Thereby, it is possible to obtain the position and attitude of a portion of a hole portion/narrow portion 421 or the like desired to be precisely measured using the measurement probe 160. Using this information, the movement mechanism control device 215 can control the movement mechanism 500 to position the measurement probe 160 in the above position and attitude. As a result, the shape can be precisely measured. The non-contact three-dimensional shape measurement device 380 enables a direct measurement of a shape of an inlet portion of a shape, such as a narrow portion, desired to be precisely measured. From this, the position and attitude of the narrow portion can be obtained, and this information can be used to position the measurement probe 160 in the above position and attitude to measure the internal shape.

In the present embodiment, similar to the first embodiment, the plurality of target marks 391 are also attached to the side surface of the probe main body 160a of the measurement probe 160, and three-dimensional positions of these marks can be also measured by the 3D position measuring machine 390 installed outside. Accordingly, it is possible to measure a positional relationship between a plurality of narrow portions measured using the measurement probe 160 with high accuracy.

The second embodiment has been described above. According to the second embodiment, the shape measurement is performed by combining the measurement results of the measurement probe which is good at measuring the shape of the narrow portion and the non-contact three-dimensional shape measurement device which is good at measuring other surface shapes. Accordingly, the shape data can be obtained by thoroughly measuring the outer surface shape and the narrow portion of the workpiece to be measured, over the entire object to be measured.

Third Embodiment

FIG. 10 is a block diagram showing a system configuration of a shape measuring apparatus according to a third embodiment together with a configuration of peripheral devices connected to the shape measuring apparatus. In the third embodiment, a plurality of shape measuring apparatuses 200 are provided, and a distance measuring light source 202 common to the plurality of shape measuring apparatuses 200 is provided as a distance measuring light source. An internal configuration of each of the shape measuring apparatuses 200 is the same as that of the second embodiment described above except for the distance measuring light source. Further, although only one 3D position measuring machine 390 is representatively shown in FIG. 10, the 3D position measuring machine 390 is connected to the movement mechanism control device 215 of respective one of the shape measuring apparatuses.

The distance measuring light source 202 generates measurement light and distributes the measurement light to each probe control mechanism 211 via an optical fiber. The method of distribution can be implemented by switching an optical path switch (not shown) in the distance measuring light source 202 in accordance with a request from the probe control mechanism 211 of each shape measuring apparatus 200. Alternatively, the measurement light from the distance measuring light source 202 may always be distributed to the probe control mechanisms 211 in order in a time division manner. In addition, after amplifying the light, the power of the light may be divided substantially equally and transmitted to each probe control mechanism 211. Processing in each shape measuring apparatus 200 is the same as that in the second embodiment described above.

The third embodiment has been described above. In the third embodiment, since the distance measuring light source 202 is common to the plurality of shape measuring apparatuses 200, it is possible to reduce the cost of the system.

In each of the embodiments described above, an example in which the detection processing of the reflected light, the photoelectric conversion, and the signal processing are performed by the probe control mechanism has been described. It is also possible to adopt a different configuration. For example, the photoelectric conversion processing and the signal processing may be performed in the measurement probe, and the electric signal may be transmitted to the probe control mechanism. Further, the photoelectric conversion and the signal processing may be performed in the distance measuring light source, and the signal processing result may be transmitted to the probe control mechanism. In this case, since it is not necessary to have an element for performing photoelectric conversion and signal processing in the probe control mechanism, it is possible to further reduce the cost of the system.

Fourth Embodiment

Next, a fourth embodiment will be described. In the measurement probe 160 shown in FIG. 3, the measurement light emitted from the head 160b in the second direction 300b has a beam shape, that is, a linear shape. By rotating the optical path switching element 163, a target to be measured is irradiated with the measurement light in a form of a beam as turning scanning light. The fourth embodiment is an example showing a measurement probe in a form different from that of the embodiments described above. Here, a configuration example of the measurement probe will be mainly described.

FIG. 11 is a diagram showing an example of a configuration of the measurement probe according to the fourth embodiment. A measurement probe 180 includes a probe main body 180a and a head 180b. The probe main body 180a includes an image sensor and an image processing circuit (not shown). The head 180b includes a laser diode 185 that outputs laser light, a conical mirror 186 that reflects the output laser light and emits the laser light as sheet-like measurement light 300c, and a camera lens 188 that guides reflected light from an inner peripheral side of the workpiece 400 irradiated with the sheet-like measurement light to the image sensor of the probe main body 180a. A tip end side 181 of the head 180b is formed of a transparent body. The laser diode 185 and the camera lens 188 can also be disposed on a base end side 182 of the head 180b.

In the present embodiment, a vertex 187 of the conical mirror 186 is irradiated with the output laser light from the laser diode 185 to transform the laser light into the measurement light 300c spread in a sheet shape. Accordingly, the portion T to be measured on the inner peripheral side of the workpiece 400 is irradiated over the entire circumference thereof. Reflected light from the portion T to be measured is guided to an image sensor (not shown) by the camera lens 188 to take an image, and image processing is performed in an image processing circuit. The obtained image data is transmitted to the probe control mechanism 211. Since the probe control mechanism 211 only needs to perform distance detection by image analysis processing using the received image data, the probe control mechanism 211 need not include various optical members and photoelectric conversion elements in the embodiments described above, and may include a processor and an image processing circuit. Accordingly, the cross-sectional shape of the target T to be measured can be measured.

The fourth embodiment has been described above. According to the present embodiment, the target to be measured can be irradiated over the entire circumference with the sheet-like light without performing the turning scanning with the measurement light. In addition, the shape measurement can be performed by taking an image of the irradiated portion by the image sensor and analyzing the image. Since the present embodiment does not require a rotation drive portion or the like, it is easy to reduce the weight and the size.

Fifth Embodiment

A fifth embodiment shown in FIG. 12 will be described. The present embodiment is an example in which a calibration mechanism is attached to a measurement probe. Since the present embodiment can be applied to the first to fourth embodiments described above, only the measurement probe and a uniaxial movement mechanism will be described here.

When measuring a shape of an inner surface of a hole, it may be desired to obtain a shape evaluation value such as cylindricity of the hole. In this case, when straightness of the movement of the measurement probe is poor, the deterioration of the straightness is directly superimposed on an evaluation value for the cylindricity of the hole, degrading the evaluation accuracy. Therefore, it is required to secure the straightness of the movement.

FIG. 12 is a diagram schematically showing an example of a calibration mechanism applicable to the embodiments described above, as a fifth embodiment. As shown in FIG. 12, the measurement probe 160 (or 180, hereinafter omitted) is mounted inside a uniaxial movement mechanism 252 as a calibration mechanism. The uniaxial movement mechanism 252 is held by the holding portion 530. The uniaxial movement mechanism 252 is formed in, for example, a tubular shape, and movably holds the measurement probe 160 in an axial direction (up-down direction in FIG. 12). In addition, a ring gauge 341 having a standard inner diameter is held at a tip end of the uniaxial movement mechanism 252. In this structure, the uniaxial movement mechanism 252 stops an axial position of the measurement 160 at a position where the measurement light 300b (300c) hits the ring gauge 341, and the measurement probe 160 performs the measurement. Since an inner diameter of the ring gauge 341 is known in advance, this allows periodic calibration to correct a measurement offset of the measurement probe 160 and output an accurate shape.

Further, by providing a ring gauge 342 having a different inner diameter, it is possible to calibrate not only the measurement offset but also sensitivity (gain) with respect to the distance. That is, the uniaxial movement mechanism 252 stops the axial position of the measurement probe 160 at a position where the measurement light 300b (300c) hits the ring gauge 342, and the measurement probe 160 performs the measurement. The sensitivity (gain) with respect to the distance of the measurement probe 160 may also be calibrated such that a difference between the diameters of the ring gauges 341 and 342, which is known in advance, and the difference between the diameters measured by the measurement probe 160 are equal to each other. In order to correct the nonlinearity of sensitivity, a total of three or more ring gauges 341 and 342 having different diameters may be used.

The fifth embodiment has been described above. According to the present embodiment, the straightness of the movement of the measurement probe can be secured by applying the calibration mechanism to the measurement probe in the embodiments described above. Accordingly, the hole diameter can be evaluated with high accuracy.

Although the embodiments and modifications of the invention have been described above, the invention is not limited to an example of the above embodiments, and includes various modifications. For example, the example of the above-described embodiments has been described in detail in order to make the invention easy to understand, and the invention is not limited to one including all the configurations described herein. A part of a configuration of an example in a certain embodiment can be replaced with a configuration of another example. A configuration of another example can be added to a configuration of an example of a certain embodiment. Another configuration may be added to, deleted from, or replaced with a part of a configuration of an example in each embodiment. A part or all of the configurations, functions, processing units, processing methods or the like described above may be implemented by hardware such as through design using an integrated circuit. Control lines and information lines shown in the figures are the ones considered to be necessary for description, and all the lines are not necessarily shown. It may be considered that almost all configurations are connected to each other.

The measurement control device according to the invention can be used for measuring shapes of various objects. Even a target including a narrow portion such as a hole portion can be accurately measured by the measurement probe. Therefore, the invention can be used as a shape measuring apparatus for measuring the shapes of various objects to be measured. In addition, since the shape measuring apparatus is also suitable for performing measurement by automatically approaching the object, it is possible to automatically perform measurement of the shape of the workpiece placed on the manufacturing line. Therefore, the shape measuring apparatus can be installed and used in a production site, an inspection site, or the like. In addition, the shape measuring apparatus according to the invention is not limited to the case of being used in a manufacturing line, and can be used in various situations in which it is necessary to measure the shape of a target.

REFERENCE SIGNS LIST

150: Connection cable
160: Measurement probe
161: Lens system
162: Rotation mechanism
163: Optical path switching element
164: Head tip end portion
165: Polarization state control unit
166: Polarization state control unit drive device
167, 190: Strain gauge
185: Laser diode
186: Conical mirror
188: Camera lens
200: Shape measuring apparatus
210: Measurement control device
211: Probe control mechanism
201, 202: Distance measuring light source
215: Movement mechanism control device
220: Display unit
221: Shape data processing device
225: Overall control device
300a: First direction
300b: Second direction
T: Portion to be measured
400: Workpiece
421, 422, 423, 424: Hole portion
500: Movement mechanism
600: Sample stage
610: Alignment mark
620: Positioning member
380: Non-contact three-dimensional shape measurement device
381: 3D Sensor control mechanism
390: 3D Position measuring machine
391: Marker
700: Manufacturing device
701: Data processing device
702: Storage device

The invention claimed is:

1. A shape measuring apparatus comprising:
a measurement probe, having a main body, configured to measure a distance from a portion to be measured of an object by irradiating the portion to be measured with measurement light;
a strain gauge attached to the main body of the measurement probe, which is configured to output a signal;
a movement mechanism configured to move the measurement probe; and
a measurement control device configured to:
control an operation of the measurement probe and an operation of the movement mechanism, so as to perform a distance measurement on a plurality of portions to be measured of the object to perform a shape measurement,
detect a residual vibration of the measurement probe based on the signal output by the strain gauge, immediately stop the operation of the movement mechanism and retract the movement mechanism in accordance with the sensing signal, and perform the measurement by the measurement probe after waiting for an amount of residual vibration of the movement mechanism to attenuate to a predetermined amount,
wherein the measurement control device is configured to:
instruct the movement mechanism to move the measurement probe to a target position,
measure the distance from the portion to be measured by the measurement probe,
determine a position to which the measurement probe has actually moved,
calculate an error between the position to which the measurement probe has actually moved and the target position,
correct the position of the measurement probe by the movement mechanism based on the calculated error,
cause the measurement probe to perform the distance measurement at a corrected position.

2. The shape measuring apparatus according to claim 1, wherein
the movement mechanism is an articulated robot, holds the measurement probe at a tip end of an arm, and moves the measurement probe with respect to the plurality of portions to be measured of the object to measure a three-dimensional shape of the object.

3. The shape measuring apparatus according to claim 1, wherein
the measurement control device performs the distance measurement by inserting, by the movement mechanism, a tip end side of the measurement probe into a hole portion provided in the object and using a hole inner periphery as the portion to be measured.

4. The shape measuring apparatus according to claim 1, wherein
the measurement probe turns a radiation direction of the measurement light and emits the measurement light.

5. The shape measuring apparatus according to claim 1, wherein
the measurement probe emits the measurement light in a sheet shape to irradiate the portion to be measured of the object, receives reflected light from the irradiated portion to be measured, takes an image, and analyzes the obtained image to perform the shape measurement.

6. The shape measuring apparatus according to claim 1, wherein
the measurement control device stores a correction amount obtained by analyzing a result of measuring, by the measurement probe, portions to be measured of a reference sample in which a position of a portion to be measured is known in advance, and corrects, by using the correction amount, a position error of the measurement probe in a movement during the measurement.

7. The shape measuring apparatus according to claim 1, further comprising:
a sensor configured to measure a position and attitude of the measurement probe from an outside, wherein
the measurement control device corrects a movement position of the measurement probe based on an output of the sensor.

8. The shape measuring apparatus according to claim 1, wherein
a non-contact three-dimensional shape measurement device is mounted on the movement mechanism, and
the measurement control device corrects a movement position of the measurement probe by measuring positions of the portions to be measured using the non-contact three-dimensional shape measurement device.

9. A shape measuring apparatus comprising:
a plurality of shape measuring apparatuses according to claim 1; and
a distance measuring light source configured to transmit measurement light to measurement probes of the shape measuring apparatuses and provided in common to the shape measuring apparatuses.

10. The shape measuring apparatus according to claim 1, further comprising:
a uniaxial movement mechanism used as a calibration mechanism to which the measurement probe is attached.

11. A manufacturing system comprising:
the shape measuring apparatus according to claim 1; a manufacturing device connected to the shape measuring apparatus via a network to transmit a measurement result, wherein
the measurement result is used for management of the manufacturing device.

12. A shape measuring method comprising:
moving a measurement probe with a movement mechanism to a target position and irradiating a portion to be measured of an object with measurement light to measure a distance from the portion to be measured;

detecting a residual vibration of the measurement probe based on a signal output by a strain gauge attached to the measurement probe, immediately stopping the operation of the movement mechanism and retracting the movement mechanism in accordance with the sensing signal, and performing the measurement by the measurement probe after waiting for an amount of residual vibration of the movement mechanism to attenuate to a predetermined amount;

determining, based on a result of the distance measurement, a position to which the measurement probe has actually moved, and calculating an error between the position to which the measurement probe has actually moved and the target position;

correcting the position of the measurement probe by moving the measurement probe based on the calculated error;

causing the measurement probe to perform the distance measurement at a corrected position; and performing the above procedure on a measurement point of the object and calculating a three-dimensional shape based on the obtained measurement result.

* * * * *